(12) United States Patent
Fawcett

(10) Patent No.: US 10,757,044 B2
(45) Date of Patent: Aug. 25, 2020

(54) CHATBOT SYSTEM

(71) Applicant: SAGE GLOBAL SERVICES LIMITED, Tyne and Wear (GB)

(72) Inventor: Alexander Christopher Fawcett, Northumberland (GB)

(73) Assignee: SAGE GLOBAL SERVICES LIMITED, Newcastle upon Tyne (GB)

( * ) Notice: Subject to any disclaimer, the term of this patent is extended or adjusted under 35 U.S.C. 154(b) by 73 days.

(21) Appl. No.: 15/986,004

(22) Filed: May 22, 2018

(65) Prior Publication Data

US 2018/0337872 A1    Nov. 22, 2018

(30) Foreign Application Priority Data

May 22, 2017    (EP) .................................. 17172332

(51) Int. Cl.
*H04L 12/58*    (2006.01)
*G06F 8/30*    (2018.01)
*G06F 16/332*    (2019.01)

(52) U.S. Cl.
CPC ................ *H04L 51/02* (2013.01); *G06F 8/31* (2013.01); *G06F 16/3329* (2019.01); *H04L 51/046* (2013.01); *H04L 51/18* (2013.01); *H04L 51/24* (2013.01)

(58) Field of Classification Search
CPC ....... H04L 51/02; H04L 51/046; H04L 41/16; H04L 51/24; H04L 51/18; G10L 15/22; G06Q 10/10; G06F 8/31; G06F 16/3329
See application file for complete search history.

(56) References Cited

U.S. PATENT DOCUMENTS

| | | |
|---|---|---|
| 2002/0055973 A1 | 5/2002 | Low et al. |
| 2017/0048170 A1 | 2/2017 | Smullen et al. |
| 2018/0096686 A1* | 4/2018 | Borsutsky ............... H04L 51/02 |
| 2018/0293983 A1* | 10/2018 | Choi ....................... G10L 15/22 |
| 2019/0166071 A1* | 5/2019 | Lim ........................ G06Q 10/10 |
| 2019/0182184 A1* | 6/2019 | Myung ................... H04L 51/02 |
| 2019/0199657 A1* | 6/2019 | Fawcett .................. H04L 51/02 |
| 2019/0199658 A1* | 6/2019 | Kim ........................ H04L 51/02 |

OTHER PUBLICATIONS

Slobodan Stojanovic, "How to Develop a Chat Bot with Node.js", smashingmagazine.com, Oct. 17, 2016.*
Search Report from European Application No. 17172332.3 dated Jan. 4, 2018.

* cited by examiner

*Primary Examiner* — Jungwon Chang
(74) *Attorney, Agent, or Firm* — Lando & Anastasi, LLP

(57) ABSTRACT

A chatbot system includes a parent chatbot and a plurality of sub-chatbots. Each sub-chatbot is associated with a specific domain. The parent chatbot is adapted to receive a user query and direct the user query to a relevant sub-chatbot. Each sub-chatbot includes at least one chatbot dialog, and is adapted to respond to the user query using the at least one chatbot dialog. Each sub-chatbot is implemented by a program entity adapted to return a return function. The return function is a function configured to accept a context object unique to the sub-chatbot as an input argument. The at least one chatbot dialog is accessed by at least one access function. The access function is a function configured to accept the context object of the sub-chatbot.

20 Claims, 5 Drawing Sheets

CHATBOT SYSTEM

CROSS-REFERENCE TO RELATED APPLICATIONS

This application claims priority under 35 U.S.C. § 119(a) to European Patent Application No. EP17172332.3, titled "CHATBOT SYSTEM", filed May 22, 2017, which is incorporated herein in its entirety for all purposes.

BACKGROUND

Aspects of the invention relate to a chatbot system. In particular they relate to a chatbot system comprising a parent chatbot and a plurality of sub-chatbots, each sub-chatbot being associated with a domain. Further aspects of the invention relate to a method of operating a chatbot system; sub-chatbot suitable for use in a chatbot system; an access function for use in a sub-chatbot; a software service system; computer software and a computer readable medium.

Chatbots are becoming an increasingly popular online method for product and service providers to interact with their customers and users. Chatbots are a form of software agent and may be referred to as chatterbots, Artificial Conversational Entities, conversational agents, smart assistants or other such terms. A chatbot is a system that mimics conversation, either by voice or text, with a user so as to provide them with information and services and also receive information from the user. The aim is for a chatbot to accurately understand a user query and to respond accordingly, for example, by returning a relevant response, or completing a task or action. Previously, the user may have carried out this interaction via an app, for example on a mobile device, or a website.

A chatbot is typically designed for a limited number of use cases, in many cases a single use case. For example, users may ask a weather chatbot for a weather forecast, book tickets for travel or entertainment by accessing the chatbot for the relevant supplier, purchase products from retailers, and record information such as receipts with an accounting system chatbot. Chatbots allow users to interact with product and service providers in a simple and intuitive manner.

Chatbots may be implemented using a combination of one or more of rules, keywords analysis, and artificial intelligence.

Users typically access chatbots through a messaging service or chat service, for example, Slack®, Facebook® Messenger®, or Skype®. This can be convenient for a user as it allows them to access a wide array of information and services without leaving their messaging app. Further, they do not need a specific app for each service they wish to use. Additionally, it is useful to a product or service supplier to provide their users with a more intuitive method of interacting with them.

Organisations may wish to provide their users with a chatbot that allows user access to a wide array of online functionality, that is, they may wish their chatbot to handle a large number of use cases. However, this can be a difficult task, particularly for large organisations and/or those with many product and service offerings. Developing a chatbot to cover such a large area would be a complicated and time-consuming task. Conventional chatbots are limited in the use cases they can handle, as there are limitations to the breadth of domain knowledge a single chatbot can have, whilst retaining the level of functionality users demand. A single chatbot required to handle too many use cases will operate unreliably and will be prone to errors, as the situation becomes too complex for the chatbot to identify and return the correct answer. Building a single chatbot within a large organisation also presents challenges. Multiple teams working on a single experience can cause bottlenecks, reduced velocity and instability.

The above information is presented as background information only to assist with an understanding of the present invention. No determination has been made, and no assertion is made, as to whether any of the above might be applicable as prior art with regard to the present invention.

SUMMARY

It is an aim of certain exemplary embodiments of the present invention to address, solve and/or mitigate, at least partly, at least one of the problems and/or disadvantages associated with the related art, for example at least one of the problems and/or disadvantages described above. It is an aim of certain exemplary embodiments of the present invention to provide at least one advantage over the related art, for example at least one of the advantages described below.

According to an aspect of the present invention there is provided methods and apparatus as set forth in the appended claims.

According to an aspect of the present invention, there is provided a chatbot system comprising a parent chatbot and a plurality of sub-chatbots, each sub-chatbot being associated with a specific domain, the parent chatbot being adapted to receive a user query and direct the user query to the relevant sub-chatbot; each sub-chatbot comprising at least one chatbot dialog, and being adapted to respond to the user query using the at least one chatbot dialog, wherein each sub-chatbot is implemented by a program entity adapted to return a return function, wherein the return function is a function configured to accept a context object unique to the sub-chatbot as an input argument, and the at least one chatbot dialog is accessed by at least one access function, wherein the access function is a function configured to accept the context object of the sub-chatbot.

The chatbot system represents a 'federated' chatbot made up of a parent chatbot and one or more sub-chatbots. Such a federated chatbot is unconventional in the art, in that a conventional chatbot system is a single chatbot adapted handle a single domain or use case. The federated chatbot provided by the chatbot system disclosed herein provides a mechanism of delegating specific queries to the relevant sub-chatbot with the correct domain knowledge. Each sub-chatbot can therefore have a 'manageable' breadth of domain knowledge, enabling functionality to be maintained whilst use cases are scaled up. The use of a parent chatbot provides a point of access for a user to access the functionality of the various sub-chatbots.

The use of chatbot system that provides a federated chatbot overcomes the limitations present when scaling up the numbers of use cases to be handled by a chatbot. A federated chatbot of this nature also provides for ease of scalability of the system as a new use case can be implemented in its own sub-chatbot without having to revise the whole chatbot system.

The chatbot system employs context objects and functions adapted to handle context objects so as to provide context isolation within the chatbot system. This context isolation confines each individual sub-chatbot and its dialogues and libraries entirely within that single sub-chatbot. As a result, the libraries and dialogues of each sub-chatbot are prevented from operating outside of the context of the sub-chatbot in which they originate. Hence one sub-chatbot is unable to interfere with another. Non-interference between sub-chatbots in a federated chatbot model is very useful as it allows for a stable and robust chatbot system.

Furthermore, as each sub-chatbot is independent of the others, new sub-chatbots can be developed without consideration of existing or future sub-chatbots. This allows for fast development of new sub-chatbots for the chatbot system. Software developers creating new sub-chatbots for the chatbot system do not have to be concerned about interoperability issues for their sub-chatbot as a sub-chatbot structured to use a context objection and suitable functions as described above will automatically have context isolation. This also allows certain types of conventional testing to be avoided, thus reducing the quality assurance burden.

Optionally, the context object of a sub-chatbot comprises an instance of that sub-chatbot.

The parent chatbot may be adapted to interact with one or more user channels.

Optionally the chatbot system is written in an interpreted programming language. The chatbot system may be written in a non-compiled programming language. Optionally, the chatbot system is in a language that implements stateless program entities. The chatbot system may be written in node.js.

The program entity implementing the parent chatbot may be a node.js package. The program entity implementing the sub-chatbot may be a node.js package. The chatbot system may be implemented in the Microsoft BOT framework. The sub-chatbot may be adapted to return a function adapted to accept a context object unique to the sub-chatbot as an input argument by modifying the sub-chatbot exports. The sub-chatbot exports of the index.js file may be modified.

The parent chatbot may be adapted to identify the specific domain associated with the query and direct the user query to the sub-chatbot associated with the identified specific domain.

The at least one chatbot dialog may be comprised within a library, and the library may be accessed by at least one access function adapted to accept the context object of the sub-chatbot.

In some embodiments, there is provided computer software which, when executed by a computer, causes the computer to provide the system described above.

In some embodiments, there is provided a non-transitory computer readable medium comprising software which, when executed by a computer, causes the computer to provide the system described above.

According to another aspect of the present invention, there is provided a method of operating a chatbot system comprising a parent chatbot and a plurality of sub-chatbots, each sub-chatbot being associated with a specific domain, comprising the parent chatbot receiving a user query; the parent chatbot directing the user query to a sub-chatbot associated with the relevant domain; the sub-chatbot responding to the user query using at least one chatbot dialog, further comprising each sub-chatbot returning a return function, wherein the return function is a function configured to accept a context object unique to the sub-chatbot as an input argument, and the sub-chatbot accessing the at least one chatbot dialog by at least one access function, wherein the access function is a function configured to accept the context object of the sub-chatbot.

The method may further comprise defining the context object for a sub-chatbot as an instance of that sub-chatbot. The method may further comprise the parent chatbot identifying the specific domain associated with the query and directing the user query to the sub-chatbot associated with the identified specific domain. The at least one dialog may be comprised within a library, and the method may comprise accessing the library by at least one access function adapted to accept the context object of the sub-chatbot.

In some embodiments, there is provided computer software which, when executed by a computer, causes the computer to perform the method described above.

In some embodiments, there is provided an on-transitory computer readable medium comprising software which, when executed by a computer, causes the computer to perform the method described above.

According to a further aspect of the present invention, there is provided a sub-chatbot suitable for use in a chatbot system comprising a parent chatbot and a plurality of sub-chatbots, the sub-chatbot comprising at least one chatbot dialog, and being adapted to respond to the user query using the at least one chatbot dialog, wherein each chatbot is implemented by a program entity adapted to return a return function, wherein the return function is a function configured to accept a context object unique to the sub-chatbot as an input argument, and the at least one chatbot dialog is accessed by at least one access function, wherein the access function is a function configured to accept the context object of the sub-chatbot.

According to a yet further aspect of the present invention, there is provided an access function for use in a sub-chatbot in a chatbot system comprising a parent chatbot and at least one sub-chatbot, wherein the access function is a function configured to accept a context object unique to the sub-chatbot as an input argument.

According to one aspect of the present invention, there is provided a software service system comprising a one or more primary systems and one or more user interfaces wherein at least one of the user interfaces comprises the chatbot system disclosed herein, wherein the chatbot system comprises one or more sub-chatbots, including at least one sub-chatbot associated with one of the one or more primary systems.

Optionally, the software service system may comprise an API interface linking the primary system with the chatbot system.

According to another aspect of the present invention, there is provided a method of user interaction with a software service system having one or more primary systems and one or more user interfaces wherein one of the user interfaces comprises a chatbot system having a parent chatbot and one or more sub-chatbots, including at least one sub-chatbot associated with one of the one or more primary systems, the method comprising: the parent chatbot receiving a user query associated with a primary system; the parent chatbot directing the user query to the sub-chatbot associated with the primary system; the sub-chatbot responding to the user query using at least one chatbot dialog, further comprising each sub-chatbot returning a return function, wherein the return function is a function configured to accept a context object unique to the sub-chatbot as an input argument, and the sub-chatbot accessing the at least one chatbot dialog by at least one access function, wherein the access function is a function configured to accept the context object of the sub-chatbot.

The method may include the sub-chatbot determining the intent of a received user query, defining the required primary system data based on the intent, requesting the required primary system data from a data store associated with the primary system via an API interface, and receiving the requested primary system data from via the API interface.

In some embodiments, there is provided computer software which, when executed by a computer, causes the computer to perform the method described above.

In some embodiments, there is provided an on-transitory computer readable medium comprising software which, when executed by a computer, causes the computer to perform the method described above.

It will be appreciated that aspects of the above invention may be combined.

BRIEF DESCRIPTION OF THE DRAWINGS

Embodiments of the invention are further described hereinafter with reference to the accompanying drawings, in which.

DETAILED DESCRIPTION

Figure 1:
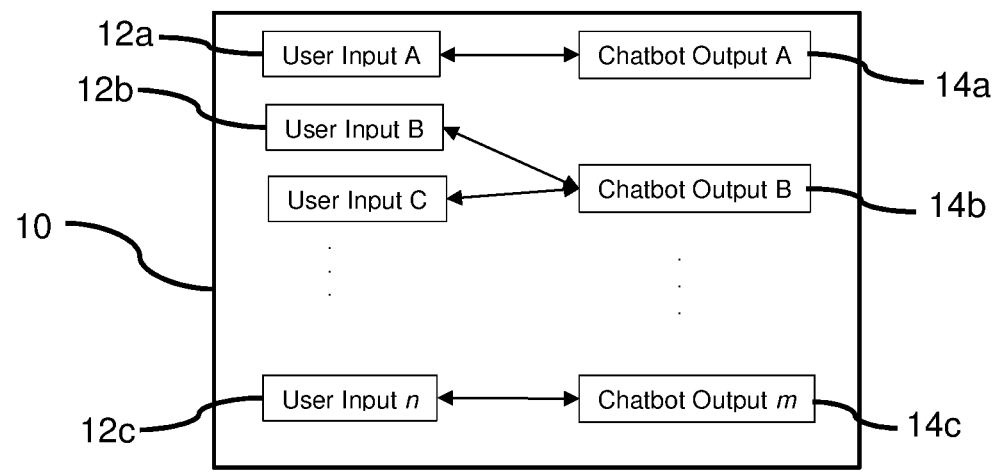
FIG. 1 is a block diagram of a prior art dialog suitable for use in an embodiment of a chat bot system.

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

Throughout the specification, the term program entity may be used to refer to a substantially self-contained software component for accomplishing a certain task or purpose. For example, in the node.js framework, program entities include modules and packages; in .NET languages, the term may refer to an assembly; in Java, the term library would be used and in Ruby, the term gem is used for a program entity.

Referring initially to FIG. 1, there is shown a block diagram of a prior art chatbot dialog 10 suitable for use in a chatbot and also suitable for use in an embodiment of a chatbot system or method according to the invention. The dialog 10 is a programmatic representation of conversational flow and comprises a plurality of user inputs 12, totalling n user inputs 12. The dialog further comprises a plurality of chatbot outputs 14, totalling m chatbot outputs 14. Links exist between the user inputs 12 and the chatbot outputs 14. Each chatbot output is linked to at least one user input 12, but may be linked to more than one. User input A 12a is linked to chatbot output A 14a. User input B and user input C are connected to chatbot output B 14b. A dialog may comprise as few as one user input and chatbot output combination. A dialog may relate to a conversational element at one stage of a user interaction with a chatbot.

In some situations, dialogs may be linked together such that completing one dialog immediately starts a second dialog. Such an arrangement may be referred to as chained dialogs or waterfall dialogs.

Figure 2:
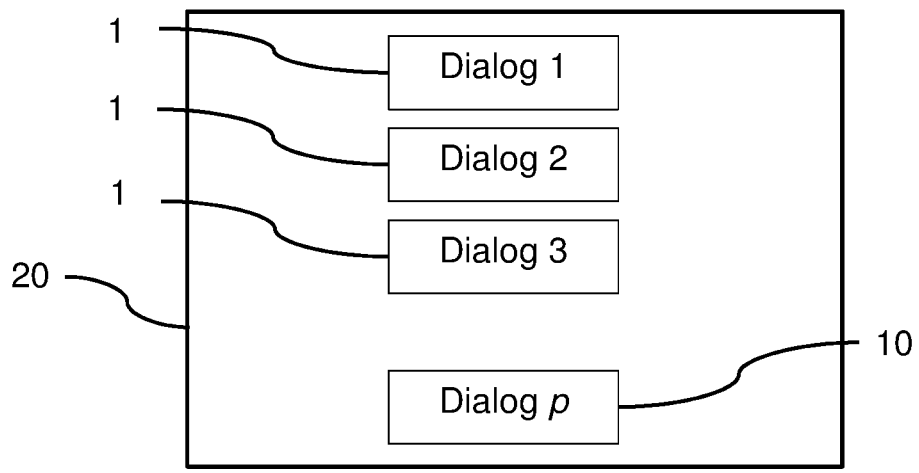
FIG. 2 is a block diagram of a prior art library suitable for use in an embodiment of a chat bot system.

Referring now to FIG. 2, there is shown a block diagram of a prior art library 20 suitable for use in a chatbot and also suitable for use in an embodiment of a chatbot system or method according to the invention. The library 20 comprises a plurality of dialogs 10, totalling p dialogs. Such libraries may be provided for use within a development framework for developing chatbots. Additionally or alternatively, a developer may create their own libraries. Libraries may combine dialogs relating to a single task or a group of similar tasks, for example, dialogs in a similar functional area would be grouped within a library.

Figure 3:
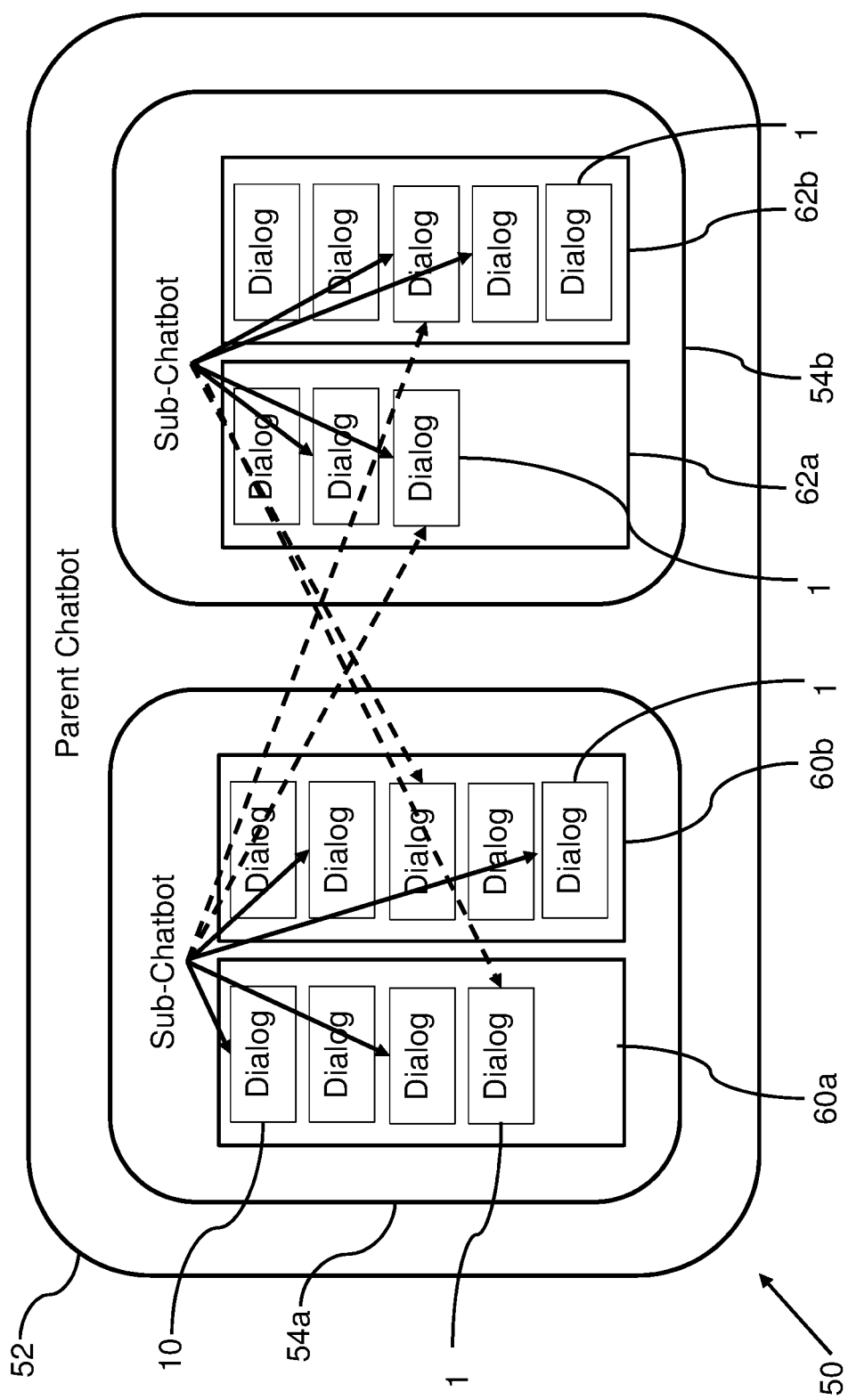
FIG. 3 is a block diagram of an embodiment of a chatbot system.

Referring now to FIG. 3, there is shown a block diagram of a possible implementation of a chatbot system, indicated generally by the reference 50. The chatbot system 50 comprises a parent chatbot 52, a first sub-chatbot 54a and a second sub-chatbot 54b. Sub-chatbots 54a and 54b will be referred to generally as sub-chatbot or sub-chatbots 54. It is to be understood that embodiments disclosed herein are not limited to two sub-chatbots, but may include any number of sub-chatbots desirable to provide a desired level of functionality. Each sub-chatbot 54 comprises a number of libraries and chatbot dialogs. Each sub-chatbot 54 relates to a specific domain, that is, an area of expertise, area of interest, or use case. For example, a sub-chatbot may relate to one product in an organisation's product offering, while another may relate to general information about the organisation. The dialogs 10 and libraries 20 of a particular sub-chatbot 54 are representative of expertise related to that sub-chatbot's domain. The parent chatbot 52 is adapted to receive a user query via one of a plurality of user channels such as Skype or Facebook Messenger (not shown). The first sub-chatbot 54a has a first library 60a and a second library 60b. The second sub-chatbot 54b has a first library 62a and a second library 62b.

In use, at the start of the user's session, they select the parent chatbot in the chosen channel. Suitable channels include Slack, Skype, Facebook Messenger and so on. The user provides an input indicating the domain of their query. The user may simply select the desired domain from a list of available options. Alternatively, the user may submit a query which is analysed by the parent chatbot to identify the relevant sub-chatbot. For example, if a user wanted to upload a receipt for an expense claim to her expenses management product, she could select the expenses management product in the parent chatbot, or send a message saying "add expenses receipt" which the parent chatbot would analyse and classify to the domain of the expenses management product. Once the relevant domain and its associated sub-chatbot 54 has been identified, the parent chatbot 52 then initiates the identified sub-chatbot. The sub-chatbot 54 accesses its dialogs and libraries to assist the user in their task. Once the task has been completed, the user may return to interacting with the parent chatbot 52 or the user interaction with the chatbot system 50 may terminate.

The chatbot system 50 may be implemented in a programming language or framework, such as node.js, that provides stateless program entities. Such stateless program entities, which in node.js include modules and packages, have the effect that chatbot dialog and libraries can be initialised by any program entity within the chatbot system 50. While the libraries 60, 62 and dialogs are intended for use only with their respective sub-chatbot 54, this is not automatically enforced within the chatbot system 50. Each sub-chatbot 54 may make a call to one or more dialogs within its libraries in order to interact with the user and carry out the resultant tasks. The allowed calls of the sub-chatbots 54 to their libraries and dialogs are shown by solid black arrows in FIG. 3. If the first sub-chatbot 54*a* and second sub-chatbot 54*b* each had a dialog called, for example, "personal_details", either of those sub-chatbots calling that dialog, would result in an unpredictable response from chatbot system 50 as both "personal_details" dialogs would be accessible to the call and able to respond. Examples of such invalid calls from a sub-chatbot to the libraries and dialogs of other sub-chatbots are shown with dashed arrows in FIG. 3. If the chatbot system is written in a non-compiled language, any such errors may be undetected until runtime.

A further issue arising within a chatbot system using stateless program entities is that it is possible for one sub-chatbot to start a conversation with another sub-chatbot. Again, this would give rise to unhelpful and unpredictable behaviour, inhibiting the user's experience.

The invalid calls to the libraries and dialogs of other sub-chatbots and conversations between sub-chatbots discussed above may lead to instability of operation and an incoherent experience for the user. They may cause device crashes or services to hang. There also may be data loss and security issues.

In a small chatbot system 50 as shown in FIG. 3, with only two sub-chatbots, it would be reasonably straight-forward to have naming rules to ensure that dialogs and libraries have unique names. In this way, it would be possible to ensure that only valid calls were made during operation. Such an arrangement would require that the chatbot system be thoroughly tested prior to release so as to ensure the naming rules have been adhered to and users are not encountering unpredictable behaviour, crashes, data loss or the like. Such testing adds expense and time to the development of the system and each new sub-chatbot.

Furthermore, for a larger scale chatbot system which may include sub-chatbots being developed by a number of different teams, such a solution quickly becomes unworkable.

As such, it can be seen that a chatbot system as shown in FIG. 3 lacks stability and robustness.

Figure 4:
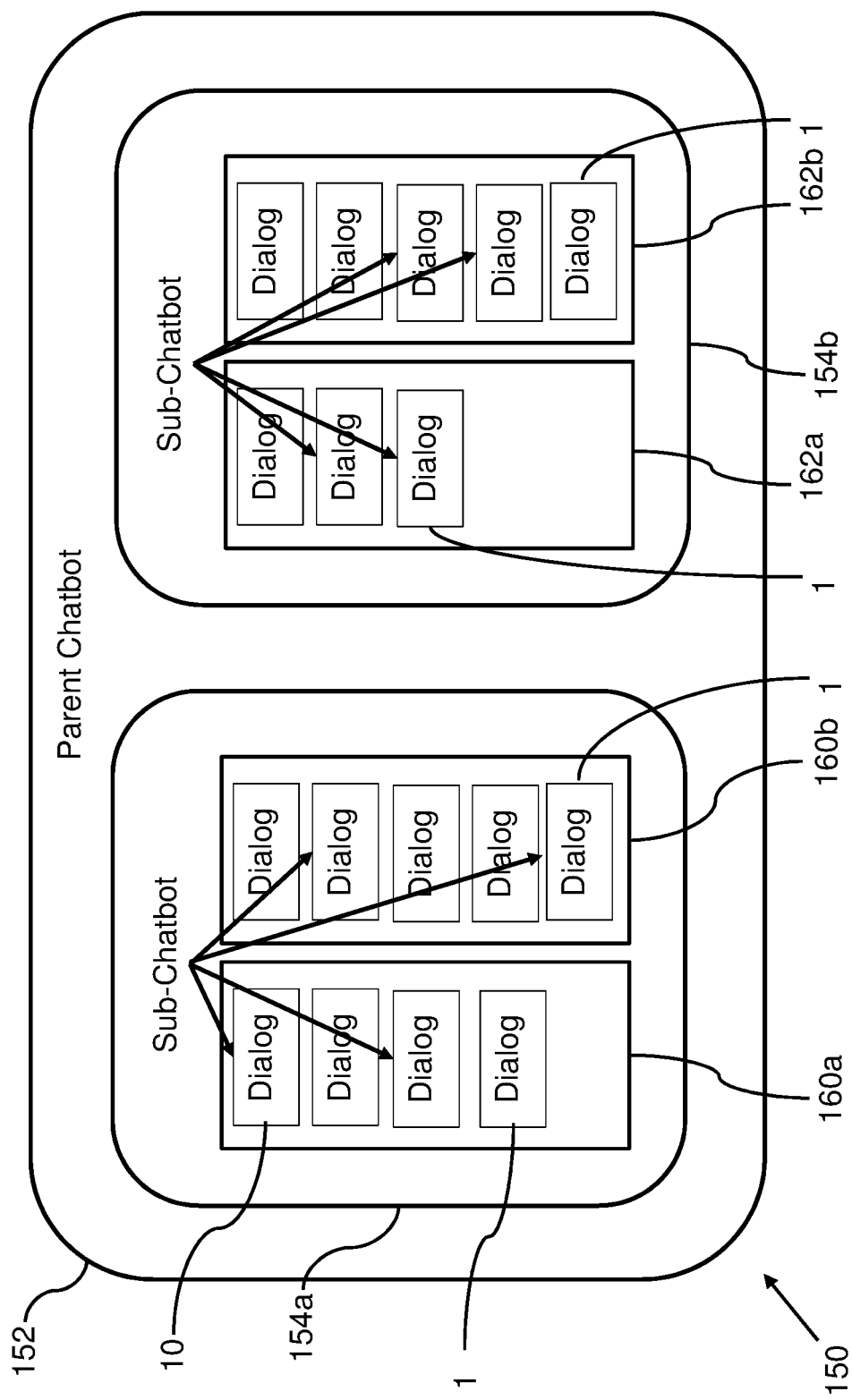
FIG. 4 is a block diagram of another embodiment of a chatbot system.

Referring now to FIG. 4, there is shown a chatbot system 150 according to an embodiment of the invention. The chatbot system 150 comprises a parent chatbot 152 and a first sub-chatbot 154*a* and a second sub-chatbot 154*b*. The first sub-chatbot 154*a* comprises a first library libraries 60*a* and a second library 60*b*, with the libraries containing a plurality of dialogs 10. Sub-chatbots 154*a* and 154*b* will be referred to generally as sub-chatbot or sub-chatbots 154. It is to be understood that embodiments disclosed herein are not limited to two sub-chatbots, but may include any number of sub-chatbots desirable to provide a desired level of functionality. It will be understood by the person skilled in the art that a library may contain only one dialog however will often comprise more than one. Each sub-chatbot 154 relates to a specific domain, such as one product in an organisation's product offering. The dialogs and libraries of a particular sub-chatbot 154 are representative of tasks and expertise related to that sub-chatbot's domain. The parent chatbot 152 is adapted to receive a user query from one of a plurality of user channels In use, at the start of the user's interaction with the chatbot system 150, he selects the parent chatbot in the chosen messaging channel. Available channels include Slack, Skype, Facebook Messenger and so on. The user provides an input indicating the domain of their query. The user may simply select the desired domain from a list of available options. Alternatively, the user may submit a query which is analysed by the parent chatbot to identify the relevant sub-chatbot. For example, if a user wanted to record hours worked by an employee to his payroll system, he could select the payroll sub-chatbot in the parent chatbot, or send a message saying "record employee hours worked" which the parent chatbot would analyse and classify to the domain of the payroll product. Once the relevant domain and its associated sub-chatbot 54 have been identified, the parent chatbot 52 then initiates the identified sub-chatbot. The sub-chatbot 54 accesses its dialogs and libraries to assist the user in their task. Once the task has been completed, the user may return to interacting with the parent chatbot 52 or the user interaction with the chatbot system 150 may terminate.

The chatbot system 150 may be implemented in a programming language or framework, such as node.js, that provides stateless program entities. Node.js is a software platform for building highly scalable service-side applications and which uses an event-driven, non-blocking I/O model, making it lightweight and efficient. Node.js is a non-compiled, interpreted programming language. Such stateless program entities, which in node.js include modules and packages, have the effect that chatbot dialog and libraries can be initialised by any program entity within the chatbot system 150.

However, to address this issue, the chatbot system 150 is implemented using context isolation. In this way, the dialogs and libraries of a particular sub-chatbot 154 may only be accessed by that sub-chatbot 154. Thus the libraries 160, 162 and dialogs 10 are prevented from operating outside of the context of the sub-chatbot 154 in which they originate. Consequently, the dialogs and libraries of one sub-chatbot 154 cannot interfere with those of another sub-chatbot 154, such that the overall chatbot system 150. In this way, invalid calls to the libraries and dialogs of other sub-chatbots and conversations between sub-chatbots are eliminated. Thus the chatbot system 150 does not experience the instability of operation or incoherent experience for the user that such invalid calls and conversations may cause. Furthermore, device crashes or hung services resulting from such invalid calls are eliminated, and any resulting data loss and security issues are avoided. It is clear that the use of context isolation provides a chatbot system that is robust and stable, and thus provides for an improvement in the operation of the computing devices involved.

Additionally, a chatbot system 150 developed in this way is easily scalable as new sub-chatbots 154 can be developed and deployed without concern that they will interfere with existing sub-chatbots 154. This is particularly useful for a large chatbot system 150. This is also an unconventional approach as typically substantial testing would be required when making changes to a live system to ensure that the modifications would operate as planned.

Context isolation is achieved by defining a context object for each sub-chatbot, wherein the context object is unique to that sub-chatbot 15. Then, each sub-chatbot program entity 154 is structured to return a function having the context object as an input. Such a function may be referred to as a return function. In this way, the libraries and dialogs become context aware. The context object of a sub-chatbot may comprise an instance of that sub-chatbot. The context object is used when adding the libraries and dialogs to the sub-chatbot.

Context isolation further includes that functions accessing the dialogs and libraries of a particular sub-chatbot 154 are adapted to accept the context object of the sub-chatbot. Such functions may be referred to as access functions.

For example, in a chatbot system 150 written in the node.js framework, in order to structure the sub-chatbot to return the return function having a unique context object as an input argument, the module exports of the index.js file of the sub-chatbot module are modified to specify the return function.

An example line of code to provide this functionality is as follows:

```
module.exports = function(parent) {
...
}
``` where "parent" is the unique context object for the sub-chatbot, and "function" is the return function. The return function may comprise all the methods and logic for the file.

The following code provides a detailed example of a return function:

```
var builder = require('botbuilder');
var sagebuilder = require('../../../libraries/sage-botlibraries-
botbuilder') ( );
module.exports = function (parent) {
    return {
        //library Export. This allows the library to be registered
with the chatbot
        libraryExport : function( ){
            //register the library.
            var library =
sagebuilder.library(parent.botName( ),'home');
            //Define the dialogs that will be called
            library.dialog('options', [
                function (session, results) {
                    builder.Prompts.choice(session,
session.localizer.gettext(session.preferredLocale( ), "hotel-
intro"), session.localizer.gettext(session.preferredLocale( ),
"hotel-hotel") + '|' +
session.localizer.gettext(session.preferredLocale( ), "hotel-
destination"));
                },
                function (session, results){
                    if(results.response.index == 0){
                        session.beginDialogSafe('hotel:select',
parent);
                    }
                    else{
                        session.send('Coming Soon!!');
                    }
                }
            ])
            return library;
        }
    };
}
```

Furthermore, the chatbot system 150 comprises a suite of access functions for accessing the libraries and dialogs adapted to accept the context object of the sub-chatbot. A typical access function would be as follows:

```
var library=sagebuilder.library(parent.botName( )
    'home');
``` where var is a declaration of a variable, library is the name of the variable, sagebuilder.library is the name of the function for use with the chatbot system 150, parent is the unique context object, botName is a method of the parent object; and home is variable that defines the names of the library.

As a further example, the following code is an access function to start a dialog in a sub-chatbot of the chatbot system 150:

```
session.beginDialogSafe('hotel:select', parent);
``` where beginDialogSafe is the name of the access function for use with the chatbot system 150, 'hotel:select' is a command and parent is the unique context object.

In another example, the following code is an access function for starting an expenses related dialog:

```
intents.matchesSafe('sage.new-expense',
    'expense:addWaterfall', parent);
```

In an example, the invention may be implemented in the Microsoft BOT Framework. The Microsoft BOT framework provides a number of libraries and dialogs for use in implementing chatbots and is thus a useful tool. If the invention were to be implemented outside of the Microsoft BOT framework certain dialogs and libraries would need to written for use by the chatbot system 150.

Figure 5:
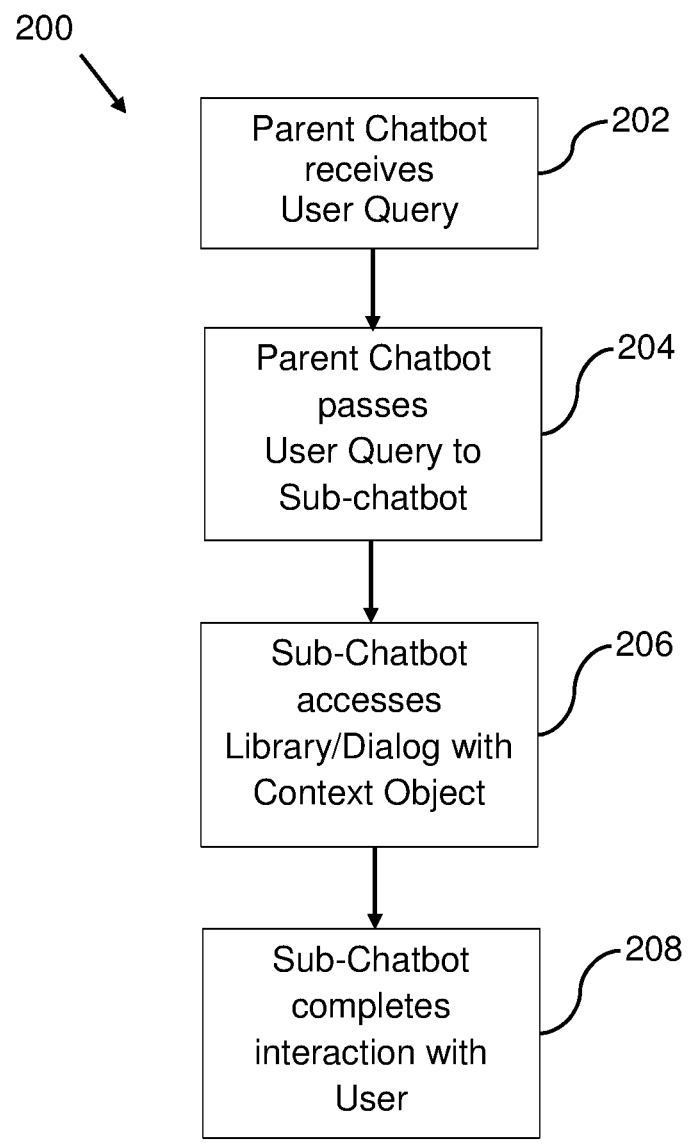
FIG. 5 is a flowchart of a method of an embodiment of a chatbot system.

Referring now to FIG. 5, there is shown a flow diagram 200 illustrating an embodiment of a method according to the invention. In step 202, the parent chatbot 152 receives a user input. The user input may be a selection of a specific domain or sub-chatbot; a request for information; an instruction to perform a task; or other input. The parent chatbot may automatically classify the user input to a specific domain. The parent chatbot may make use of a natural language product or service, for example the Language Understanding Intelligent Service (LUIS) from Microsoft. The parent chatbot may use standard techniques such as keyword analysis and the like to identify the correct domain for the user input. The user input is received via a user channel such as a messaging app on a user's mobile device. User inputs may be provided to the chatbot system 150 via a connector that provides an interface between the messaging app and the chatbot system 150.

In step 204, the parent chatbot initialises the relevant sub-chatbot for the user input. If the parent chatbot 152 has analysed the user input to automatically identify the relevant domain for the user's query, this step may comprise passing the user's query to the sub-chatbot 154.

In step 206, the sub-chatbot 154 accesses its libraries 60 and dialogs 10 by including its unique context object in its function calls to the access functions. The sub-chatbot 154 manages the conversational flow with the user to address the user's input.

In step 208, the sub-chatbot has completed its interaction with the user. The sub-chatbot 154 may simply terminate the user's session or may return control to the parent chatbot.

Figure 6:
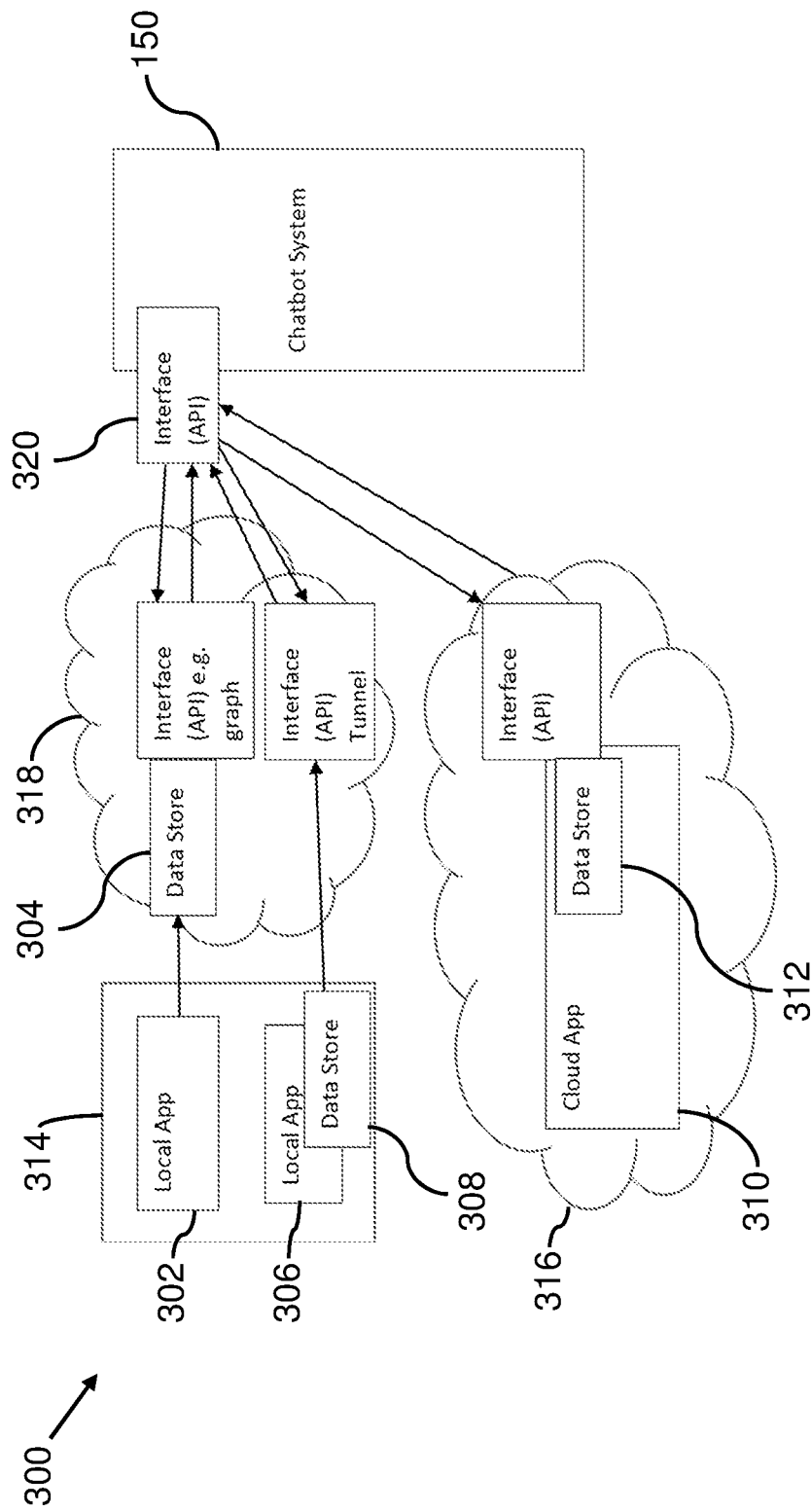
FIG. 6 is a block diagram of an embodiment of a software service system.

Referring now to FIG. 6, there is shown a block diagram of a software service system according to an embodiment of the invention. The software system is indicated generally by the reference numeral 300. The software service system comprises a chatbot system 150 and a plurality of primary systems. The software service system 300 may comprise only one primary system. The primary systems may be cloud based or local to the user and may use either cloud or local data storage. The system 300 comprises a first local primary system 302 having a cloud-based data store 304, a second local primary system 306 with a local data store 308 and a cloud based primary system 310 having a cloud based data store 312. The local systems 302, 306 are located on a computing device 314 local to a user. The cloud based primary system 310 and its data store are located in first cloud storage 316. The data store 304 of the first local primary system is located on a second cloud storage. The primary systems may relate for example to accounting, payroll, payments, HR management, business intelligence or other business services.

The chatbot systems comprises a plurality of sub-chatbots, at least one for each primary system and may comprise additional sub-chatbots associated with general functionality within the system 300 for example a customer services sub-chatbot or a feedback sub-chatbot. The chatbot system 150 is connected to the data stores 304, 308, 312 of each of the primary systems 302, 306, 310 via an interface 320 implemented by an Application Programming Interface (API). The API may include a Web APU, a tunnel API or another cloud based storage API. In this system 300, the chatbot system 150 operates as a user interface for the primary systems 302, 306, 310. The system 300 may include further user interfaces however they are not shown here.

In use, the parent chatbot 152 of the chatbot system 150 receives the user's initial query and starts the sub-chatbot for the relevant domain, which is the sub-chatbot associated with the primary system of the user query. The relevant sub-chatbot is identified as described previously. The sub-chatbot 154 analyses the user query to identify the intent and defines the data fields of the entity data of interest required to address the user's query, where entity data is the data within an existing primary system. So if the query is about an expense, the sub-chatbot 154 decides based on this what data fields in the source application are to be returned to satisfy the request.

The sub-chatbot 154 then requests the identified entity data from its associated primary system, via the API interface 320. This requested data is retrieved for the associated data store and returned to the sub-chatbot. The sub-chatbot then outputs the data to the user via the messaging channel.

The system 300 is able to provide this service to the user in a robust and reliable manner due to the context isolation included in the chatbot system 150. Should additional primary systems be included in the system 300, an associated sub-chatbot may be added to the chatbot system 150 to deal with user queries for that new primary system. Such a new sub-chatbot would not need to be subject to naming conventions, nor would it need extensive testing to ensure that it would not interfere with the existing sub-chatbots 154.

The chatbot system disclosed herein may be referred to as a federated chatbot system. The federated chatbot system enables the rapid release of new sub-chatbots with additional functionality working across a variety of primary products and services.

The chatbot system disclosed herein comprises a federated chatbot made up of a parent chatbot and one or more sub-chatbots. The federated chatbot employs context isolation which limits all sub-chatbots and their dialogues and libraries entirely within a single sub-chatbot. As a result, the libraries and dialogues of each sub-chatbot are prevented from operating outside of the context of the sub-chatbot in which they originate. Hence one sub-chatbot is unable to interfere with another. This results in an improvement in the functioning of the computing devices implementing the chatbot system, as they are subject to reduced crashes, and data loss and security issues associated with interference between sub-chatbots is avoided.

Conventionally, interference between individual sub-modules in a modular or federated software program, such as sub-chatbots in the chatbot system disclosed herein, would be prevented using naming rules during development of the software program modules. Such naming rules may comprise the use of namespaces and assigning a unique identifier within sub-modules. The implementation of the naming rules requires the developers to adhere to those rules. Furthermore, it may be necessary to include code in the software to check and/or ensure the rules are being adhered. Clearly, this adds to be burden to developing a new sub-module such as a sub-chatbot. Pre-launch testing is then typically required to ensure the rules have been adhere to and that the sub-module is not going to cause errors or introduce instability during operation.

The use of context isolation wherein each chatbot is implemented by a program entity adapted to return a return function, wherein the return function is a function configured to accept a context object unique to the sub-chatbot as an input argument, and the at least one chatbot dialog is accessed by at least one access function, wherein the access function is a function configured to accept the context object of the sub-chatbot therefore allows sub-chatbots to be developed and deployed quickly. Its results in more elegant, shorter code, reducing memory requirements and processing load. It further results in a robust chatbot system that can handle user queries relating to very large number of domains without instabilities such as crashing, data loss, or security issues.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

The terms and words used herein are not limited to the bibliographical or standard meanings, but, are merely used to enable a clear and consistent understanding of the invention.

Throughout the description and claims of this specification, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim of the invention are to be understood to be applicable to any other aspect, embodiment, example or claim described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The reader's attention is directed to all papers and documents which are filed concurrently with or previous to this specification in connection with this application and which are open to public inspection with this specification, and the contents of all such papers and documents are incorporated herein by reference.

What is claimed is:

1. A chatbot system comprising a processor and a memory operatively coupled to the processor, the chatbot system further comprising:
   a parent chatbot and a plurality of sub-chatbots, each sub-chatbot being associated with a specific domain,
   the parent chatbot being adapted to receive a user query and direct the user query to a relevant sub-chatbot;
   each sub-chatbot comprising at least one chatbot dialog, and being adapted to respond to the user query using the at least one chatbot dialog, wherein each sub-chatbot is implemented by a program entity adapted to return a return function,
   wherein the return function is a function configured to accept a context object unique to the sub-chatbot as an input argument, the context object configured to provide context isolation between each of the plurality of sub-chatbots such that there is no interference therebetween, and
   the at least one chatbot dialog is accessed by at least one access function, wherein the access function is a function configured to accept the context object of the sub-chatbot.

2. The chatbot system of claim 1 wherein the context object of a sub-chatbot comprises an instance of that sub-chatbot.

3. The chatbot system of claim 2 written in an interpreted programming language, and/or written in a non-compiled programming language, and/or written in a language that implements stateless program entities.

4. The chatbot system of claim 1 wherein the program entities implementing the parent chatbot and the sub-chatbot are node.js packages.

5. The chatbot system of claim 4 wherein the sub-chatbot is adapted to return a function adapted to accept a context object unique to the sub-chatbot as an input argument by modifying the sub-chatbot exports.

6. The chatbot system of claim 1 wherein the parent chatbot is adapted to identify the specific domain associated with the query and direct the user query to the sub-chatbot associated with the identified specific domain.

7. The chatbot system of claim 1 wherein the at least one chatbot dialog is comprised within a library, and the library is accessed by at least one access function adapted to accept the context object of the sub-chatbot.

8. Computer software which, when executed by a computer, causes the computer to provide the system of claim 1.

9. A non-transitory computer readable medium comprising software which, when executed by a computer, causes the computer to provide the system of claim 1.

10. A method of operating a chatbot system comprising a parent chatbot and a plurality of sub-chatbots, each sub-chatbot being associated with a specific domain, comprising:
    the parent chatbot receiving a user query;
    the parent chatbot directing the user query to a sub-chatbot associated with the relevant domain;
    the sub-chatbot responding to the user query using at least one chatbot dialog, further comprising
       each sub-chatbot returning a return function, wherein the return function is a function configured to accept a context object unique to the sub-chatbot as an input argument, the context object configured to provide context isolation between each of the plurality of sub-chatbots such that there is no interference therebetween, and
       the sub-chatbot accessing the at least one chatbot dialog by at least one access function, wherein the access function is a function configured to accept the context object of the sub-chatbot.

11. The method of claim 10 comprising defining the context object for a sub-chatbot as an instance of that sub-chatbot.

12. The method of claim 11 comprising the parent chatbot identifying the specific domain associated with the query and directing the user query to the sub-chatbot associated with the identified specific domain.

13. The method of claim 12 wherein the at least one dialog is comprised within a library, and the method comprising accessing the library by at least one access function adapted to accept the context object of the sub-chatbot.

14. Computer software which, when executed by a computer, causes the computer to perform the method of claim 10.

15. A non-transitory computer readable medium comprising software which, when executed by a computer, causes the computer to perform the method of claim 10.

16. A sub-chatbot suitable for use in a chatbot system comprising a processor and a memory operatively coupled to the processor, the chatbot system further comprising:
    a parent chatbot and a plurality of sub-chatbots, each sub-chatbot being associated with a specific domain, and the parent chatbot directing a user query to a sub-chatbot associated with the relevant domain,
    the sub-chatbot comprising at least one chatbot dialog, and being adapted to respond to the user query using the at least one chatbot dialog,
    wherein each sub-chatbot is implemented by a program entity adapted to return a return function, wherein the return function is a function configured to accept a context object unique to the sub-chatbot as an input argument, the context object configured to provide context isolation between each of the plurality of sub-chatbots such that there is no interference therebetween, and
    the at least one chatbot dialog is accessed by at least one access function, wherein the access function is a function configured to accept the context object of the sub-chatbot.

17. Computer software stored in a memory of a computer, which, when executed by a processor of the computer, causes the computer to provide the sub-chatbot of claim 16.

18. A non-transitory computer readable medium comprising computer software which, when executed by a computer, causes the computer to provide the sub-chatbot of claim 16.

19. An access function for use in a sub-chatbot in a chatbot system comprising a processor and a memory operatively coupled to the processor, the chatbot system further comprising:
- a parent chatbot and a plurality of sub-chatbots, each sub-chatbot being associated with a specific domain, and the parent chatbot directing a user query to a sub-chatbot associated with the relevant domain,
- the sub-chatbot comprising at least one chatbot dialog, and being adapted to respond to the user query using the at least one chatbot dialog,
- wherein each sub-chatbot is implemented by a program entity adapted to return a return function, wherein the return function is a function configured to accept a context object unique to the sub-chatbot as an input argument, the context object configured to provide context isolation between each of the plurality of sub-chatbots such that there is no interference therebetween, and
- the at least one chatbot dialog is accessed by at least one access function, wherein the access function is a function configured to accept the context object of the sub-chatbot.

20. A non-transitory computer readable medium comprising computer software which, when executed by a computer, causes the computer to provide the access function of claim 19.

\* \* \* \* \*